May 16, 1933.   A. L. SEMON ET AL   1,908,925

FLUID STRAINER

Filed Oct. 30, 1930

Inventors
A.L. Semon and W.S. Walker
By John A. Seifert
Attorney

Patented May 16, 1933

1,908,925

UNITED STATES PATENT OFFICE

ALBERT LEON SEMON, OF EAST ORANGE, NEW JERSEY, AND WOODS S. WALKER, OF FLUSHING, NEW YORK

FLUID STRAINER

Application filed October 30, 1930. Serial No. 492,326.

This invention relates to fluid strainers adapted to be connected in pipe lines and particularly in lines for supplying cooling liquid to artificial refrigerators to separate scale, sediment and solid particles of various kinds from the liquid, and it is the principal object of the invention to provide a strainer having less number of parts which are readily dissembled for cleaning a filtering screen or for the replacement of the parts.

It is another object of the invention to provide a strainer of a structure so that a greater amount of straining surface of a filtering screen relative to the size of the supporting casing is exposed to the liquid than has heretofore been possible.

In the present type of strainer used for the purpose specified a filtering screen is supported by a closure member threaded into an opening in a casing enclosing the screen and adapted to be connected in a pipe line, the engagement between the closure member and casing being maintained liquid tight by interposing a gasket between said members and forcibly drawing the closure member to the casing, the parts of the strainer being assembled before connecting the strainer in a pipe line. Due to the forcible connection of the closure member with the casing and the effect of the accumulation of sediment on said connection great force must be applied to the closure member to release the same from the casing for the removal of the filtering screen for the purpose of cleaning or replacement of parts which will exert great stress and strain on the pipe connections with the casing causing breakage and loosening of said connections and consequent leakage.

To overcome this disadvantage the closure member is secured in liquid tight connection with the casing by a connecting member secured in the closed end of and within the casing and extended through the closure member with securing means threaded onto the member at the outer side of and abutting the closure member and adapted to apply a securing force centrally of the closure member whereby no great force is necessary for a tight joint.

Other objects and advantages will hereinafter appear.

In the drawing accompanying and forming a part of this application Figure 1 is an elevational view of the embodiment of the invention fully assembled.

Figure 1:
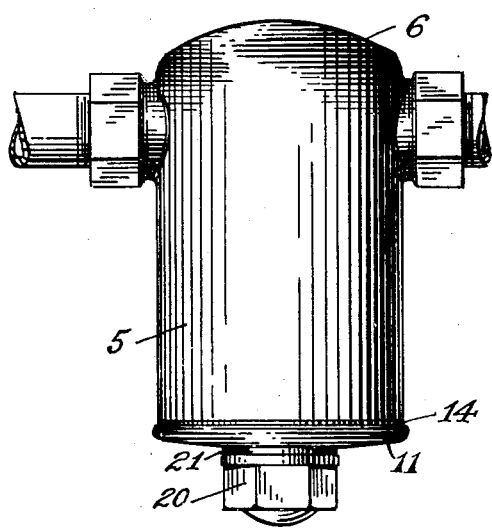
Figure 2:
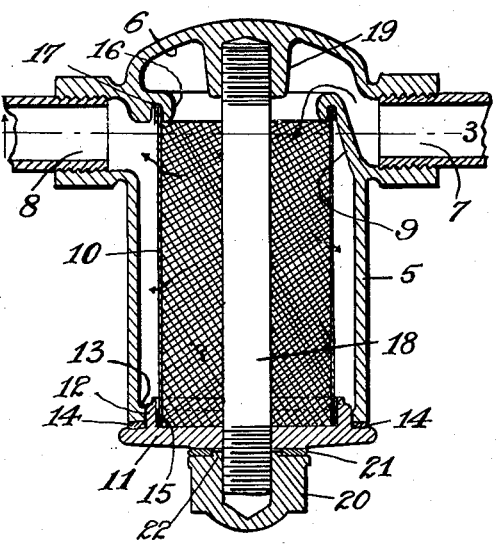
Figure 2 is a longitudinal sectional view of the device as shown in Figure 1.
Figure 4:
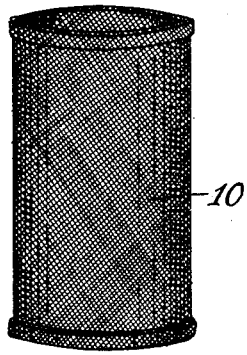
Figure 4 is an elevational view of the filtering screen.
Figure 3:
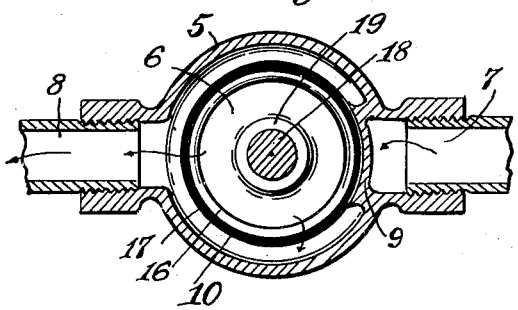
Figure 3 is a cross sectional view taken on the line 3—3 of Figure 2 looking in the direction of the arrow.

In the embodiment of the invention illustrated in the drawing there is provided a cylindrical casing 5, one end of which casing is closed and of dome shape in cross section, as shown at 6 in Figure 2, and said casing having inlet and outlet ports 7 and 8, respectively, threaded for connection of fluid carrying pipes and arranged adjacent the closed end 6 in opposed alinement with each other in a plane extending transversely of the longitudinal axis of the casing. The inlet port 7 is restricted by a flange or wall portion 9 extended inward from the casing and in an oblique direction across the port from the wall of the casing to cooperate with the casing end to form an annular passage to direct the flow of fluid toward the closed end, and the outlet port being in direct communication with the body of the casing and leading from said annular passage, as shown in Figures 2 and 3.

To separate the scale, sediment and solid particles of various kinds from the fluid entering the casing through port 7 a filtering screen 10 of cylindrical shape and constructed of a fine wire mesh with the edges at the ends folded over in juxtaposed relation to the body portion to form a rolled edge to prevent unraveling of a mesh and for a purpose to be hereinafter described, is mounted in the casing through an opening in the end of the casing opposite the closed end 6, with the walls of the screen extending parallel to and in proximity to the walls of the casing. The screen is releasably supported in the casing by a closure member in the form of an annular plate 11 of a diameter to close the open casing end and arranged with an annular ridge or flange 12 extended from the inner face and spaced from the periphery thereof to slidably engage a rib 13 projecting inwardly from the casing wall at the open end thereof and form a seat for the end of the casing wall, and to provide a liquid tight connection and prevent leakage a gasket 14 of packing material is interposed between the plate seat and the end of the casing wall.

The filtering screen is engaged at one end within the annular flange 12 of the closure plate with the rolled edge abutting said flange, as shown at 15 in Figure 2, and the opposite end of the screen is engaged in a seat adjacent the closed end of the casing comprising an annular flange 16 integral with and extended laterally and inwardly from the wall of the casing above the outlet port 8 and the wall portion 9 adjacent the inlet port 7 so that the fluid from port 7 will flow over and about the flange, said flange being arranged in the under surface thereof with a recess adapted to be engaged by and form a seat for the rolled edge of the screen, as at 17. By this method of supporting the screen the fluid from port 7 must flow through the screen before leaving the casing through the outlet port 8, as indicated by the arrows in Figure 2. The length of the screen is such that it will be securely clamped and supported between the flange 16 and closure plate 11 when said plate is secured to the casing, and the surface of the screen is substantially equal to the interior surface of the casing, as clearly shown in Figure 2.

The closure member or plate is secured to the casing in liquid tight connection therewith without imparting a twisting motion to and consequent distortion of the casing by a rod or post 18 fixed to the casing by arranging a boss 19 extended from the interior wall of the closed end and centrally of the casing, and securing the rod at one end in said boss either by screw threading or welding. The free end of the rod is extended centrally through the casing opening and upon which the plate is engaged by passing the rod through a perforation in the plate. A nut 20 is threaded onto the projecting end of the rod in abutting relation to the closure plate to draw said plate firmly to the casing with a packing gasket 21 interposed between the nut and plate 11 to provide a liquid tight joint between the plate and nut, the nut having a rib 22 extending from the inner face and about the periphery of the bore thereof to engage in the opening of the packing gasket 21 and prevent the material of the gasket coming into contact with the rod threads and interfering with the threading of the nut to the rod. It will be obvious that no great force is required to be imparted to the nut to render the closure connection liquid tight as the securing force is applied centrally of the closure member and not at the marginal portion thereof with a consequent twisting strain exerted on the casing, the twisting strain being taken up by the rod 18 and is not imparted to the pipe connections. This method of securing the closure member to the casing will also prevent the twisting or distorting of the filtering screen through the rotary motion of the closure member with the resulting tearing of the mesh and the necessary replacement of the screen. The rod 18 may be integrally cast in the closed end of the casing instead of arranging the boss 19 in said end.

Having thus described our invention, we claim:

1. In a strainer for pipe lines, a cylindrical casing having an opening in one end, a rod fixed at one end in the casing wall opposite to and extended through said opening, a closure plate for the casing opening loosely engaged on the free end of the rod in engagement with the casing to close the opening with the end of the rod projecting beyond the plate and arranged with an inwardly extending annular flange to slidably engage the casing wall, a flange extended laterally from the interior casing wall adjacent to and about the rod mounting in the casing, and a cylindrical screen engaged within the annular plate flange and supported at the ends between the plate and the casing flanges.

2. In a strainer for pipe lines, a casing having an opening at one end and the opposite end closed by a dome shaped wall, a rod fixed at one end in the dome shaped wall and extended through the opening, an annular flange extended inward from the casing adjacent the dome shaped end in which the rod is mounted and arranged concentric thereof, a plate engaged and secured on the rod to close the casing opening and having an annular flange adapted to extend into the casing, and slidably engage the interior wall of the casing to form a liquid tight joint therewith, a cylindrical screen of less diameter than the casing engaged at one end by and within the flange of the closure plate and at the opposite end seated against the casing flange to support the screen in spaced relation to the casing wall, and centrally of the dome shaped wall of the casing a fluid inlet port to the casing at one side of the casing flange, said flange with the casing and dome shaped wall forming a fluid passage leading from the inlet port into one end of the screen, with the dome shaped wall uniformly directing the flow into said end of the screen and an outlet port from the casing at the side of the casing flange opposite the inlet port and leading from the space between the screen and casing adjacent said casing flange.

3. In a strainer for pipe lines, a casing having an opening arranged with a rib projecting inwardly, a rod fixed at one end in the casing wall opposite to and extended through said opening, a plate member having a perforation centrally thereof to engage the free end of the rod with the plate in engagement with the casing to close the opening and arranged with an annular flange to slidingly engage the rib to form a liquid tight joint therewith, a cylindrical screen engaged at one end within the flange of the plate and supported by the plate to extend within the casing radially of the rod, and a nut threaded onto the rod exteriorly of the plate member to clamp the plate member to the casing.

4. In a strainer for pipe lines, a cylindrical casing having one end open, said casing having an annular flange extended inwardly from the side wall adjacent to and cooperating with the end wall of the casing to form an annular channel in the casing, and said flange having an arcuate recess therein opposite the open end of the casing, the casing having an inlet port through the side of the casing leading to the annular channel formed by the flange and an outlet port in the side of the casing opposite to and in line with the inlet port leading from the body of the casing, a rod carried axially of the closed end of the casing and extended beyond the open end of the casing, a plate loosely engaged on said rod to close the casing opening and having an annular flange to extend into the casing to form a liquid tight joint with the casing wall, a cylindrical wire mesh screen of less diameter than the casing engaged at one end in the recess in the channel forming flange in the casing and the other end engaging the closure plate within the flange thereof, and a cap nut threaded onto the rod exteriorly of the closure plate to draw and secure the latter to the casing without imparting a twisting strain on the screen.

Signed at New York city, in the county of New York, and State of New York, this 7th day of October, 1930.

ALBERT LEON SEMON.
WOODS S. WALKER.